H. STIER.
JOINT FOR METAL TANKS.
APPLICATION FILED MAY 11, 1912.
1,196,490.
Patented Aug. 29, 1916.
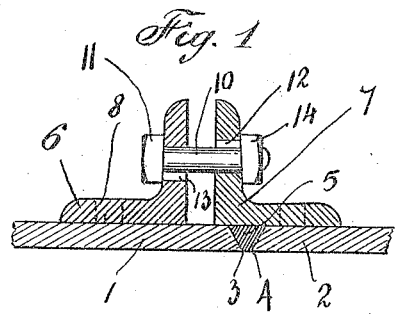
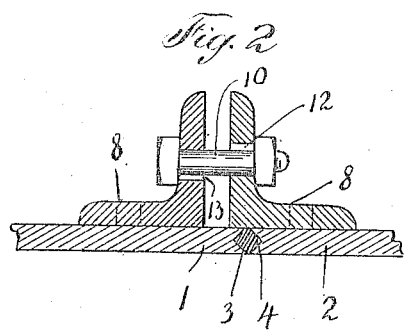
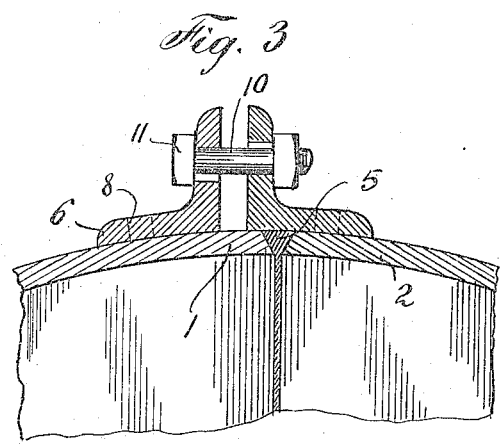
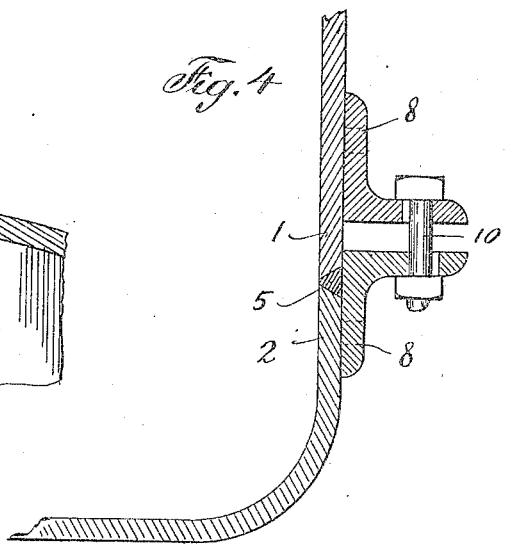
WITNESSES
Aug. Miller
INVENTOR
Herman Stier
By Robt. Klotz
Atty.

UNITED STATES PATENT OFFICE.

HERMAN STIER, OF CHICAGO, ILLINOIS.

JOINT FOR METAL TANKS.

1,196,490.
Specification of Letters Patent.
Patented Aug. 29, 1916.

Application filed May 11, 1912. Serial No. 696,558.

*To all whom it may concern:*

Be it known that I, HERMAN STIER, a citizen of the United States, residing at Chicago, Illinois, have invented certain new and useful Improvements in Joints for Metal Tanks, of which the following is a specification.

The essential object of this invention is to provide an improved means for making a tight joint between the abutting ends of the walls of metallic vats or tanks, and is particularly efficacious in connection with that class of tanks which are provided with an enameled lining or coating. It has been customary heretofore, to provide such tanks with lugs or angle-irons, similar to those shown in the drawings forming a part hereof, which angle-irons or lugs were riveted to the wall or walls of the tanks, the angle-irons being connected with bolts, which, when tightened, would draw the angle-irons together and thus produce a tight joint in the tank. It has been found in practice, however, that the rivets which bind the angle-irons and the wall of the tank together, tend to pull out or loosen, and the inner heads of such rivets will frequently cause the enameling to chip off and thus permit the liquid contained within the tank to come into contact with the metal wall of the tank and thus destroy or corrode the same.

In the drawings, all of the figures are sectional views showing the application of the invention to various styles of tanks and in different places upon the tanks.

Figure 1 shows the invention as applied to the side of a tank having a straight wall; Fig. 2 is a modification of the form shown in Fig. 1; Fig. 3 shows the invention applied to a curved tank; and Fig. 4 shows the invention applied substantially as in Fig. 1, the tank being somewhat different in shape from the tank shown in any of the other figures.

The walls 1 and 2 are made of iron or other metal, and the object of the invention is to produce a tight joint between the adjacent edges 3 and 4. Packing 5 may be placed between said edges 3 and 4. In the preferred form of the invention the packing 5 is made of cement, but any other material will answer. The angle-irons 6 and 7 are secured, respectively, to the walls 1 and 2 and extend along said walls parallel to the joint practically the entire length thereof, or if so desired, instead of using angle-irons, a plurality of angle-brackets may be provided, there being as many pairs of brackets as is deemed necessary considering the particular use for which any tank is designed. In that particular flange or arm of the angle-iron which directly engages the walls 2, a perforation or perforations 8 are provided. Instead of riveting the angle-iron 6 to the wall 1, the angle-iron is first laid upon said wall and then a very hot flame, such as can be obtained from an acetylene or an oxy-hydrogen burner, is directed in said apertures 8 with the result that the angle-iron thus becomes welded or fused upon the outer surface of the wall 1, and in this manner the angle-iron and the wall become integrally united together, there being no bolts or rivets connecting said parts.

The angle-iron 7 and the wall 2 are secured together in the same manner as angle-iron 6 and wall 1, the angle-iron 7 being preferably so placed that it projects outwardly from wall 2 and across the packing 5 and the space between edges 3 and 4, and into engagement with the wall 1. The angle-iron 7, obviously, thus helps make the joint tighter and prevents blowing out of the packing 5, or leaks between the packing and the edges 3 and 4.

In order to draw the angle-irons together, bolts 10 are provided, the heads 11 of which bear against the angle-iron 6, while the nut 14 which screws upon the threaded end of the bolt bears against the angle-iron 7. The perforations 12 and 13, through which the bolt 10 passes, are so arranged that the bolt 10 comes into engagement with the wall of perforation 14 as near as possible to the walls 1 and 2 and into contact with the wall of the perforation 13 as far as possible from said walls. When the nut 12 is tightened, therefore, the effect will be to cause the angle-iron 7 to bear downwardly in Figs. 1, 2, and 3, and thus help make a tighter joint than might otherwise be obtained.

In the preferred form of the invention (shown in Figs. 3 and 4) the packing 5 is triangular in section; hence, as the bolts 10 are tightened, the packing is compressed upon all three sides for the walls 1 and 2 will press upon two of the sides, while the angle-iron 7 will press upon the third side, and thus thoroughly compress the packing and cause the same to fill up every nook and crevice in the joint and make same absolutely tight.

It is obvious that many changes may be made in the details of construction without departing from the scope of the invention or of the various claims.

I claim as my invention:

1. A tank, comprising metallic walls having their contiguous edges formed to extend at an angle to each other, a packing interposed between said edges and means for drawing said edges toward each other to compress said packing.

2. A tank comprising metallic walls having their contiguous edges formed to extend at an angle to each other, a packing interposed between said edges, and means attached to the exterior of said walls for drawing said edges toward each other to compress said packing.

3. A tank comprising metallic walls having their contiguous edges formed to extend at an angle to each other, a packing interposed between said edges, and means attached to the exterior of said walls and covering and externally concealing the packing for drawing said edges toward each other to compress said packing.

In testimony whereof I have hereunto affixed my name in the presence of two witnesses.

HERMAN STIER.

Witnesses:
ROBT. KLOTZ.
AUG. MILLER.

Copies of this patent may be obtained for five cents each, by addressing the "Commissioner of Patents, Washington, D. C."